UNITED STATES PATENT OFFICE.

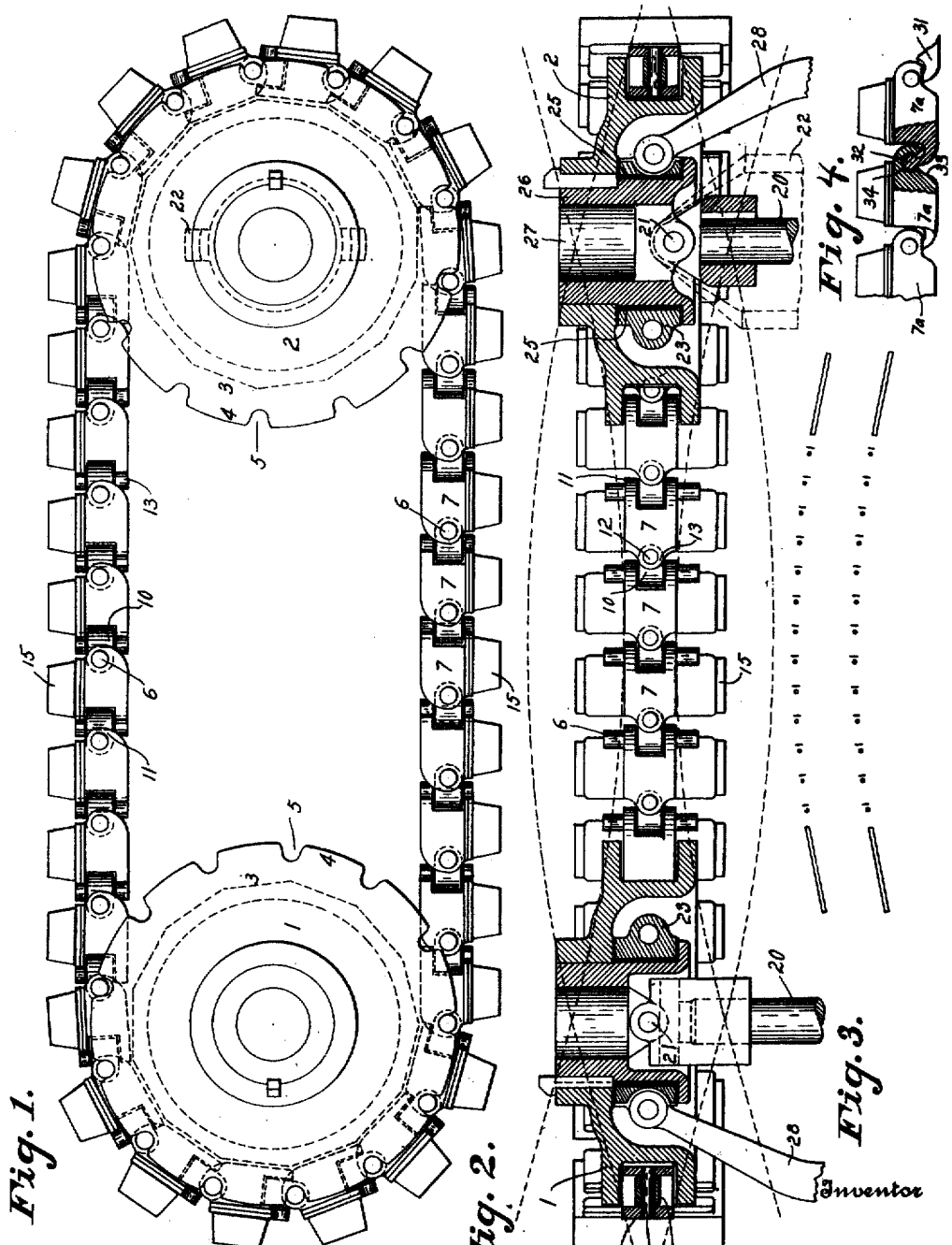

RAY GROVER AND WILLIAM A. MEYER, OF MILWAUKEE, WISCONSIN.

CATERPILLAR-TRACTOR.

1,316,092.   Specification of Letters Patent.   Patented Sept. 16, 1919.

Application filed May 25, 1916. Serial No. 99,744.

*To all whom it may concern:*

Be it known that we, RAY GROVER and WILLIAM A. MEYER, citizens of the United States, residing at the city of Milwaukee, county of Milwaukee, and State of Wisconsin, have invented new and useful Improvements in Caterpillar-Tractors, of which the following is a specification.

Our invention relates to improvements in tractor chains for that class of vehicles commonly known as caterpillar tractors, and in which the vehicle travels upon chains which revolve about the supporting front and rear wheels on the respective sides of the vehicle.

Our invention contemplates utilizing all of the wheels of the vehicle as steering wheels, or at least the front and rear wheels, and the object of our invention is to provide a form of chain which will be capable of adjusting itself to the wheels and will not unship nor bind upon the sprocket teeth or parts of the wheel which the chain engages, in such a manner as to cause injurious cramping or loss of power.

In the drawings—

Figure 1 is a side elevation of the front and rear wheels of a traction vehicle equipped with our improved traction chain, the body of the vehicle and driving connections being omitted.

Fig. 2 is a horizontal section drawn to a plane exposing the axles and steering connections of a front and rear wheel of a traction vehicle equipped with our improved traction chain.

Fig. 3 is a diagram illustrating the position which the chains tend to assume when the vehicle is traveling along a circular path.

Fig. 4 is a detail view showing a modified form of chain link joint.

Like parts are identified by the same reference numerals throughout the several views.

The supporting wheels of the vehicle comprise sprocket wheels 1 and 2, the rims of which are formed to suit the requirements of the chains upon which these wheels travel. In the drawings, the wheel rims 3 are provided with projecting marginal flanges 4, suitably notched at 5 to receive the projecting ends of cross pins 6 forming part of the connection between the links 7 of the chain. Each link 7 has universal joint connection with the adjacent links. In Figs. 1 and 2 connecting members 10 are employed. Each of these connecting members is provided with a cross pin 6 which has its respective ends journaled in lips 11 carried by one of the links 7, and between which the connecting member 10 is received. The connecting member 10 is provided near its other end with a cross pin 12 disposed at right angles to the cross pin 6 and having its end journaled in lips 13 carried by the next succeeding link 7, and which also embrace the connecting member 10, thereby forming a double knuckle joint. Each link is also provided with a tread projection 15, preferably removably socketed in the link, and which may, if desired, be non-metallic.

The pivot pins 6 allow the links to oscillate upon each other in such a manner that the chains can adjust themselves to the curvature of the wheels 1 and 2 over which they travel, the projecting ends of the pins 6 engaging in the recesses 5 of the wheels to prevent slipping. Pivot pins 12, passing through members 10 and knuckles 13, make laterally hinged connections between the several links, permitting the chain to move freely in a horizontal arcuate path. When the wheels are turned for steering purposes, this chain will not have any material tendency to leave the wheels nor will the links, of which said chain is composed, cramp or bind.

It will be understood that the power will be applied to all of the wheels through driving axle shaft 20, universally jointed at 21, preferably in the central plane of each wheel; also that each of the wheels will be supported from a stationary axle 22 formed in sections pivotally connected with each other with the axis of such pivotal connections extending vertically through the axes of the respective driving joints 21. The outer section 23 of each supporting axle is provided with a skein 25 upon which the wheel hub 26 is mounted, and which may therefore be swung upon said vertical axis for steering purposes. The outer section 27 of the driving axle will, of course, be connected with the wheel hub 26, and steering arms 28 may be employed for oscillating the outer supporting axle section and skein for steering purposes. The general arrangement and organization of the driving and steering mechanism will preferably be similar to that disclosed in prior patent to H. A. Frantz, No. 644,590, dated March 6, 1900, for motor wheel, and further description thereof is therefore deemed unnecessary.

Owing to the fact that the power is applied to each of the wheels over which our improved tractor chains run there will be little tendency for either chain to draw upon one wheel from the other wheel, since the chains are not used to transmit power from one wheel to the other, and owing to the fact that the links are universally jointed or articulated, it is obvious that they are free to assume the curved position indicated diagrammatically in Fig. 8. It will, of course, be understood that owing to the increased distance between the wheels along the curved line which the chains tend to assume over that of a straight line connecting said wheels, the chains will tend to tighten when the wheels are turned for steering purposes, and this will prevent them from assuming a position exactly in the arc of curvature along which the vehicle travels. But the chains will ordinarily be sufficiently loose when the vehicle is traveling in a straight line to allow them to approximately conform to the arc of curvature along which the vehicle travels when turning, unless the turn is unusually abrupt.

Referring now to Fig. 4, it will be observed that each of the links 7ª is provided at one end with a projecting post 31 having a ball 32 on the end thereof. The opposite end of the link is provided with an offset portion 33 corresponding with the post 31 but having a spherical socket 34 to receive the ball 32 carried by the next succeeding link. With this construction each link is articulated with the next by a ball and socket joint which, of course, allows a universal movement of each link upon the next.

Our improved traction chain is peculiarly adapted for use on motor driven vehicles which travel over soft earth into which the wheels of an ordinary traction vehicle would deeply sink. Our tractor chains are therefore particularly adapted for use in connection with farm tractors. Any tendency of the wheels to sink into the ground increases the supporting area and gripping engagement of the tread member 15 with the ground. When the slack of the chains is taken up, the entire length of chain on the under side will, of course, be in gripping engagement with the soil. By using all four wheels for driving and steering purposes, we are able to produce a vehicle which may travel freely over marshy ground and which may be turned at will without danger of unshipping the chains.

We claim:—

1. The combination with a motor driven vehicle having wheels provided with spaced peripheral notches, means for turning each wheel upon a vertical axis, and means for rotating each wheel separately to drive said vehicle, of endless traction chains each adapted to pass over and engage with one front and one rear wheel, said chains comprising a series of tread links, a series of connecting links adapted to make universal joint connection between said tread links, transverse pivot pins joining each connecting link with one tread link and adapted to engage in the peripheral notches of said wheels, and vertical pivot pins joining each connecting link with a second tread link.

2. The combination with front and rear wheels of a motor driven vehicle, of means for turning each wheel upon a vertical axis for steering purposes, means for separately applying motive power to each wheel, traction chains, each arranged in the form of an endless belt connecting one front wheel with one rear wheel, and having peripheral interlocking engagement with the wheels, each of said chains comprising a series of links in universal joint connection with each other.

3. An endless traction chain for caterpillar tractors, comprising a plurality of links universally jointed with each other, each link being provided with a tread portion projecting outwardly from the central portion of the link between the jointed ends thereof, and spaced from the tread portions of the adjacent links in the series.

4. An endless traction chain adapted to connect front and rear wheels of a motor driven vehicle, and to provide a track upon which said wheels may run, said chain comprising a series of links in universal joint connection with each other, and a series of tread blocks adapted to support the jointed portions of the links from contact with the ground, each of said tread blocks being secured to one of the links between its jointed ends, and said tread blocks having walls which diverge from the opposing walls of adjacent blocks to provide open spaces between the blocks of increasing width from their bases to their tread surfaces.

In testimony whereof we affix our signatures in the presence of two witnesses.

RAY GROVER.
WILLIAM A. MEYER.

Witnesses:
LEVERETT C. WHEELER,
IRMA D. BREMER.

Copies of this patent may be obtained for five cents each, by addressing the "Commissioner of Patents, Washington, D. C."